(Model.)

2 Sheets—Sheet 1.

E. B. KEITH.
PLATFORM GRAIN BINDER.

No. 245,636.

Patented Aug. 16, 1881.

Attest
J. C. Perkins.
Henry L. Keith.

Inventor.
Ethan B. Keith
Per Lucius C. West
Atty.

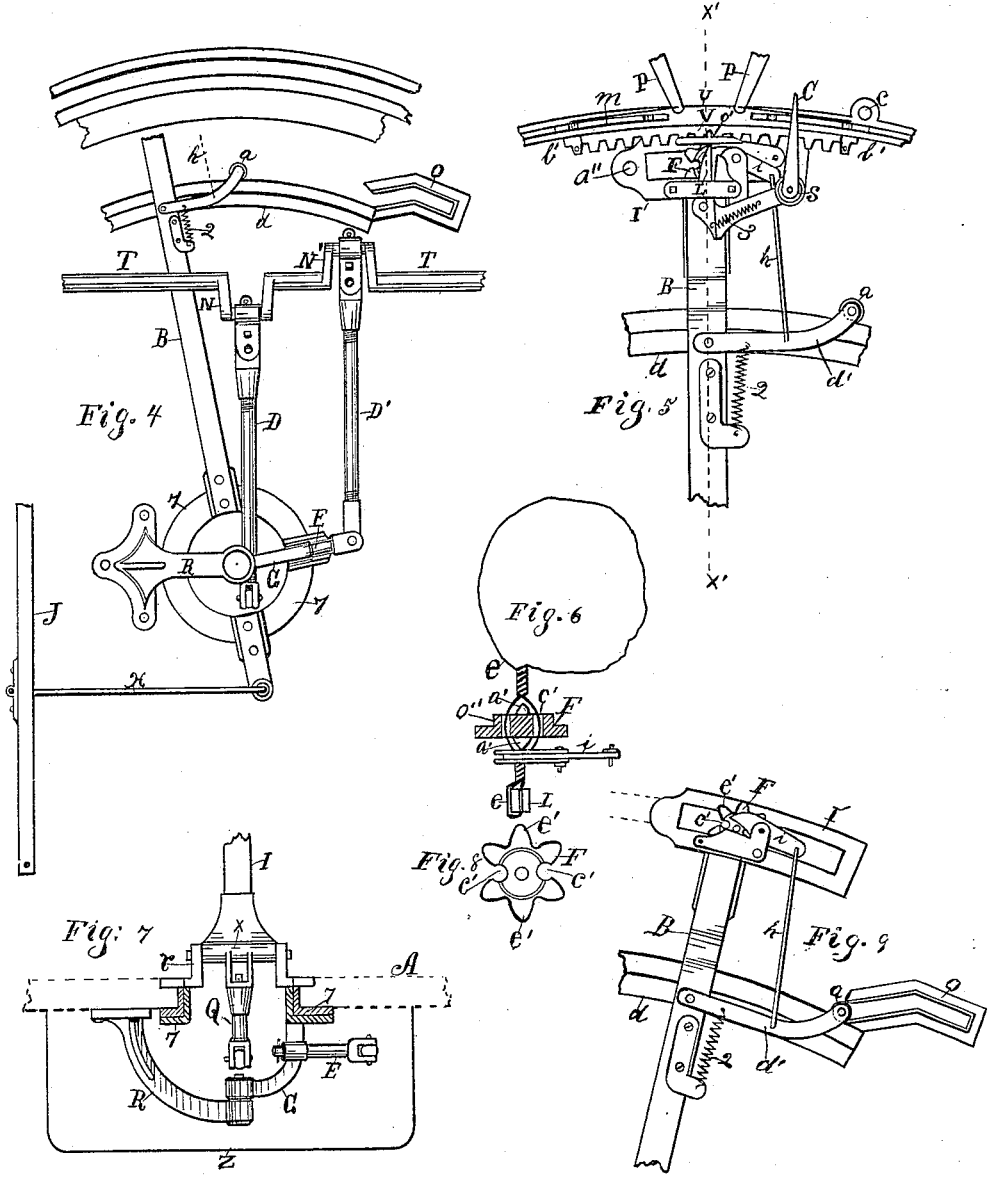

UNITED STATES PATENT OFFICE.

ETHAN B. KEITH, OF GALESBURG, MICHIGAN.

PLATFORM GRAIN-BINDER.

SPECIFICATION forming part of Letters Patent No. 245,636, dated August 16, 1881.

Application filed April 9, 1880. (Model.)

*To all whom it may concern:*

Be it known that I, ETHAN B. KEITH, of Galesburg, State of Michigan, have invented new and useful Improvements in Self-Binding Reapers, of which the following is a specification.

My invention relates to the platform or table of a reaper and the machinery used in connection with the same in effecting my purpose.

The main object of my improvements is the construction and arrangement of such machinery, in connection with the platform of a reaper, as will bind the grain on the platform, upon which it falls from the sickle, thus obviating the transportation of the grain to other platforms and remote localities, and especially avoiding the practice, now common in most reapers, of elevating the grain previous to binding. The principal advantages of such a construction are the dispensing with cumbersome and expensive mechanical parts, thus saving expense and lightening the draft and obviating the tangling and shelling of the grain.

I effect my objects by the construction substantially as explained in the following description.

Figure 1:
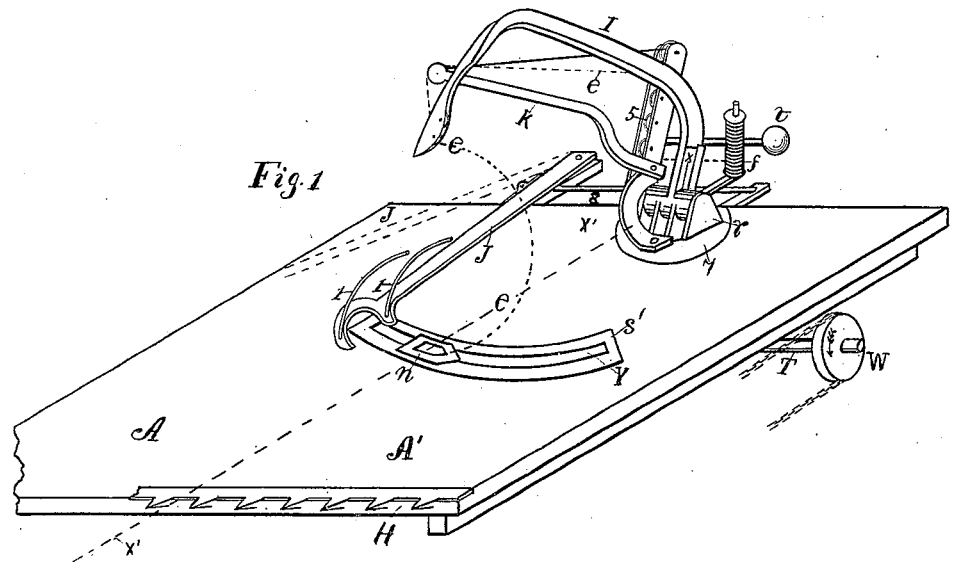
Figure 2:
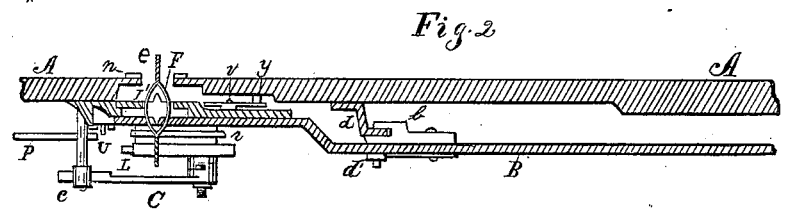
Figure 3:
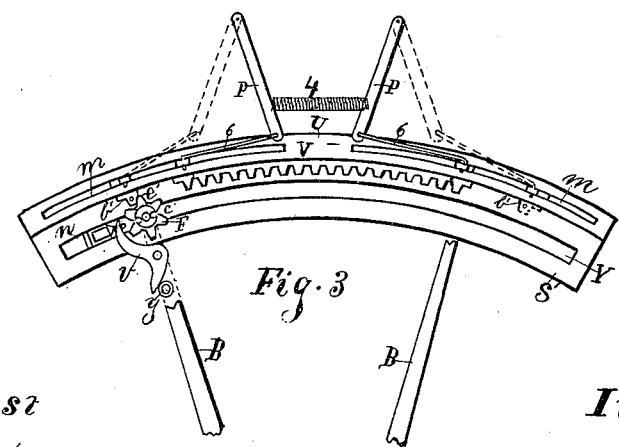

In the accompanying drawings, forming a part of this specification, in which similar letters of reference indicate like parts, Figure 1 is a perspective view of the platform and needle-bar and other machinery located above the platform, also showing pulley to which power may be attached and the intended location of sickle or cutter bar. Fig. 2 is an edge and sectional view upon nearly the line indicated by dotted lines $x'$ $x'$ in Figs. 1 and 5, the variation being in the part L and connected parts, which are not shown in section in order for a better illustration. Fig. 3 is an under-face view of parts located on the under side of the platform, under and forward of slot Y, in Fig. 1. Fig. 4 is an under-face view, showing the construction and arrangement of bars, shafts, and cranks located under the platform in Fig. 1. Fig. 5 shows an under-face view of the main parts of mechanism which does the binding, detached portions of which are shown in Figs. 3, 6, 8, and 9. Fig. 6 shows the position of the wire when around the bundle of grain, and where the wire is twisted and cut off, also a sectional view of twister. Fig. 7 is a view of parts located under the platform and under rear end of needle-bar in Fig. 1, also a latitudinal sectional view of platform on about the line through $r$ parallel to edge of platform in Fig. 1; Fig. 8, plan view of the twister. Fig. 9 shows a detailed portion of Fig. 5, showing the location and operation of the shear in cutting the wire.

A is the platform or table shown in Figs. 1, 2, and 7. This platform is located in the position common in most reapers.

H in Fig. 1 shows the location of sickle or cutter bar in relation to platform A.

I is the needle-bar, secured to rocking shaft X, Figs. 1 and 7. This shaft X is located in bearings $r$ which are secured to turning head 7, said head being located in table A, and so constructed as to admit of a partial horizontal revolution, by which means needle-bar I swings from left to right and back over slot Y in plate S' and in table A. The object of shaft X being constructed so as to rock is that needle-bar I may move up and down when descending through hole in plate $n$, or ascending out of the same when a bundle is being bound.

5 is the tension-frame, containing a number of pulleys, one above another, among and around which the wire $e$ runs (after leaving spool $f$) to put a proper tension on the same. This frame 5 is secured to turning head 7.

$t$ is a weight connected to tension-frame 5 for the purpose of bringing the same to and beyond a perpendicular position, in order to take up slack wire when the needle-bar I rises after having assisted in binding a bundle. In place of weight $t$, a spring may be used, if preferable.

K is a bar secured to the standard of tension frame or bar 5, having a pulley in its upper end, over which wire $e$ runs on its way to the eye of the needle-bar I, in which eye are also located one or more pulleys for the wire to run in.

J is an arm, having its front end curved to clear needle-bar I, said end bearing forks 1 1. The object of this arm is to act, in conjunction with wire $e$, in gathering the grain into a bundle at the proper point for binding the same, said point being between curved wire $e$ $e$ and forks 1 1, as shown in Fig. 1, the needle-bar I in this figure being shown descending on its way to enter hole in plate n. The beam to which arm J is pivoted is not necessary when table A extends back far enough.

8 is a rod connecting bar J with turning head 7, Fig. 1.

W is a pulley or gear-wheel, secured to shaft T, to which power may be applied from the main wheel.

To the bottom of rocking shaft X is secured the swiveled arm Q, Fig. 7, to which joint is connected bar D, Fig. 4, said bar connecting with crank N in shaft T. By this construction and arrangement needle-bar I is moved up and down when shaft T revolves.

Arm R is secured on under face of platform A, Figs. 4 and 7. To this arm R is pivoted arm G.

To arm G is swiveled arm E, and to arm E is connected bar D', said bar connecting with crank N' in shaft T. By this construction turning head 7 is made to turn in its bearings in table A when shaft T revolves, by which means needle-bar I is swung right and left through the length of slot Y in plate S' and in table A. It is designed that the rear side or edge of slot Y shall be a little lower than the front edge, in order that the grain may not catch under it. Cranks N N' are located in shaft T, at about right angles to each other.

B is a bar secured to turning head 7, said bar having a sweep corresponding to that of the needle-bar I over and above the table A, bar B, as before stated, being located under platform A. To this bar B are secured and connected plate I', twister F, clamp L, shear i, lever C, mortised bar b, bar d', with its wheel a, rod h, springs 3, 2, and s, plate n, and hook v, and projection o', all of which parts are carried with it in its right-and-left sweep.

The construction, arrangement, and use of said parts I will now proceed to explain.

Plate I' is secured to end of bar B. It has a hole through it directly under hole in plate n. The two plates I' n are bolted together at a'', Fig. 5, plate n being above table A and plate I' below. Plate I' has a circular incision through it corresponding to the circular raised portion o'' of twister F, Fig. 6, into which incision said raised portion o'' is loosely inserted, by which arrangement plate I' carries twister F and allows it to revolve.

The shear i is located as shown in Figs. 2, 5, 6, and 9. It is connected with bar d' by rod h. Bar d' is pivoted to bar B, and carries friction-wheel a. Spring 2 is connected with bar d' and bar B, to hold shear i in proper position by causing wheel a to engage track d. A shouldered slotted bar, O, is located at the right terminus of track d, into the slot of which bar wheel a enters when, by the peculiar shape of the slot, shear i is brought to bear on wire e. Shear i, when operating, shuts snugly between two plates, as shown in Fig. 6.

The lever C is connected with clamp L by a clutch or loose joint, (seen in Fig. 2,) and its use is to open clamp L by engaging stud c, said stud being provided with a friction-wheel, Fig. 2. Around the clutch-joint of lever C is a spiral spring, S, to close clamp L after lever C has ceased to engage stud c, and also to hold lever C in proper position to engage stud c. A further explanation will be given in the description of the operation.

Spring 3 is for the purpose of assisting in opening clamp L, one jaw of which clamp is stationary. The one which lever C operates is pivoted to the bar to which spring 3 is attached, Fig. 5.

F is the twister, constructed substantially in the form shown in Figs. 3, 6, and 8. It has two grooves or mortises, c' c', opposite to each other, the object of which is to receive the wire e, as shown in Fig. 6. The raised centers a' a' of the twister are to remove the twist of the wire a little distance above and below the twister, that the shear i may sever the wire, as in Fig. 6, and that the upper twist, with its two ends, may easily pass from the twister. Cogs e' e' of the twister are to engage cogs on plate V, Figs. 3 and 5, said plate being secured to under face of table A forward of slot Y, and the object of the cog engagement is to cause the twister F to revolve when carried back and forth by bar B, by which means wire e is twisted above and below the twister.

Hook v is pivoted to plate I', Figs. 2 and 3. Its purpose is explained in the description of the operation.

The several parts above enumerated, which are connected with the front end of bar B, are held in position by bolts and plates securing them to plate I', substantially as shown in Figs. 2, 3, 5, and 9.

b is a slotted bar secured to upper face of bar B, Fig. 2, into which slot shouldered bar d is loosely inserted. The object of this construction is to hold bar B in position and allow it to move back and forth at the same time. The shouldered bar d also forms a track for wheel a, as before stated.

P P are bars pivoted to the under face of table A, (directly under A' in Fig. 1,) shown in Fig. 3. These bars are connected by rods 6 6 with detached cogs b' b' by means of the shouldered projections of said cogs, which project through and run in slots in plate U, as explained in the operation.

Z illustrates a guard, which, if needed, may be secured to the under side of table A, to protect the machinery from the ground or other obstruction. (See Fig. 7.)

In explaining the operation of the device, after the end of the wire coming from the eye of needle-bar I has been inserted down through hole in plate n, through right-hand mortise c' of the twister F, and into clamp L, where it is held firmly, we will imagine arm J located as indicated by dotted lines in Fig. 1 and needle-bar I at its farthest right-hand sweep. When sufficient grain has fallen on the table A at A' for a bundle, it is moved back onto the plate S', between arm J and needle-bar I, by a suitable rake constructed and arranged for the purpose, the same being operated by the machinery. (Not here shown.) The device is now set in motion by a suitable contrivance for the purpose, (not here shown,) when, by the revolution of shaft T, arm J, needle-bar I, with its wire e, and bar B, with its several parts, are all brought to the left hand of slot Y, wire e and forks 1 1 gathering the grain together into a bundle, when needle-bar I descends through holes in plates n and I'. Twister F, in its transit, engages cogs in cog-plate V till one of its cogs e' engages detached cog b', (shown in Fig. 3.) At the same time of this engagement of cogs projection o' (shown in Fig. 5) also engages detached cog b', carrying it to the point indicated by dotted lines at the left of Fig. 3. By this arrangement the left-hand mortise c' of the twister F is kept in position to receive wire e from the needle I in its descent. Bars B and I now swing to the right and arm J to the left. When bar B has started a little on its course to the right, hook v is thrown out by engaging stud y, said stud being fastened in the under side of platform A, Figs. 2 and 3. In the latter figure it will be seen hook v will have caught wire e, the object of this being to carry the wire snugly into mortise c'. Now at this point the wire e is around the bundle and in both mortises c' c' of the twister F. As bar B carries the twister on toward the right, said twister revolves by again engaging cogs on cog-plate V in the opposite direction, by which means wire e is twisted, as shown in Fig. 6. When bar B arrives at the point where lever C engages stud c the clamp L is opened, when it catches the wire e below the lower twist, Fig. 6, and holds it for the next operation. At this point, also, projection o' and cog e' engage the right-hand detached cog b' in Fig. 3. By this arrangement the mortise c' of the twister is held in position to allow the needle-bar to ascend, which it now does, leaving the wire e again in mortise c'. At this point wheel a, secured to bar d', enters slot in bar o, Fig. 9, when shear i is brought to bear on the wire at the point shown in Fig. 6, cutting it off, when the upper twist, with its two ends, goes with the bundle off of the platform onto the ground. Spring 4, in the operation, brings the detached cogs b' b' back to place, as shown in Fig. 3.

The advantage of the clutch or broken joint of lever C, it will also be observed in the operation, is to allow lever C to pass stud c on its transit to the left without affecting clamp L.

What I claim as new, and desire to secure by Letters Patent, is—

1. Bars D D', connecting with cranks N N' of the shaft T, said shaft driven by power mechanism of a reaping-machine, and said bars operating the turning head and needle-bar, imparting to the latter a vertical and lateral motion, all in combination, whereby cumbersome gearing and wheels are dispensed with and the combination is adapted to operate with a grain-platform located near the ground, substantially as specified, to effect the objects set forth.

2. Shaft T, having its cranks connecting with bars D D', said bars operating the turning head and needle-bar, all substantially as and for the object set forth.

3. The twister, with its cogs or lobes and slots, loosely revolving in its circular receptacle between plate I' and the laterally-oscillating twister-bar, said twister engaging cogs V and detached cogs b' b', all combined substantially as specified and shown, whereby the twister revolves in adverse directions in its transit and is stopped and held at given points, as set forth.

4. The platform of a grain-binder, having slotted plate S', cog-plate, and detached cogs, and arms P P, with their spring, and rods 6 6, in combination with a needle-bar and twister-bar connecting with the turning head and provided with projection o', and bearing a twister or knotter adapted to operate with them, all substantially as set forth.

5. The twister-bar, with its projection o' and bearing a twister, in combination with bars P P, with their spring and rods, detached cogs, and cog-plate V, all substantially as described and shown, whereby a band-knotter is controlled as specified.

6. The platform A of a grain-binder, which supports the cutter-bar and receives the grain as its falls from the sickle, said table provided with its slotted plate, cog-plate, detached cogs, arms P P, with actuating-spring, and rods 6 6, in combination with a needle-bar and twister-bar, with projection o', said twister-bar connecting with mechanism to operate it in a lateral transit, and bearing a twister, all adapted to operate with the platform in binding grain without elevating it, substantially as specified and shown.

7. In a grain-binder, the combination, substantially as constructed and arranged, of lever C, with its clutch-joints, spring S, clamp L, and friction-roller c.

8. The twister-bar, with slotted plate I', carrying a twister, and having plate n secured to plate I' and located above the slotted table-plate, substantially as specified, whereby the twister is held and carried in a revoluble position and the end of the needle-bar is allowed to pass through the table at the proper point to co-operate with the twister in binding a bundle of grain.

9. Table A, provided with slotted plate S', turning head 7, needle-bar, twister-bar, having projections o', and plates I' and n, bars D D', shaft T, with its cranks, twister, cog-plate, detached cogs, and spring-actuated arms P P, and rods 6 6, all combined and adapted to operate with necessary auxiliaries for binding grain upon the platform without elevating the same, substantially as set forth.

10. The combination of platform A of a grain-binder, slotted and provided with the turning head and needle-bar, gathering-arm J, with connecting-rod to turning head, band-arm and tension, twister-bar, with projection $o'$, and plates $I'$ and $n$, twister, shaft T, with its cranks, bars D D', arms R G, arm E, swiveled arm Q, cog-plate, and detached cogs, and arms P P, with their spring, and rods 6 6, all substantially as set forth and shown.

11. Twister-bar, with its projection $o'$, and plates $I'$ and $n$, twister, clamp L, lever C, with its clutch-joint, said lever engaging friction-stud $c$, spring S, shear $I'$, rod $h$, spring 3 2, bar $d'$, with wheel $a$ engaging track $o$, track and rest $d$, hook $v$, stud $y$, slotted plate $b$, secured to bar B, cog-plate V, detached cogs $b'$ $b'$, spring-actuated arms P P, and rods 6 6, all in combination with the driving mechanism of a grain-binder, substantially as set forth.

ETHAN B. KEITH.

Witnesses:
HENRY L. KEITH,
AMOS D. ALLEN.